United States Patent
Philpott (10) Patent No.: US 12,104,982 B2
(45) Date of Patent: Oct. 1, 2024

(54) BRAKE CALIPER HOUSING AND A METHOD OF CHECKING SEALING OF SAME

(71) Applicant: ArvinMeritor Technology, LLC, Troy, MI (US)

(72) Inventor: Daniel Philpott, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 335 days.

(21) Appl. No.: 17/671,923

(22) Filed: Feb. 15, 2022

(65) Prior Publication Data

US 2023/0258524 A1    Aug. 17, 2023

(51) Int. Cl.
| F16D 55/18 | (2006.01) |
| F16D 65/00 | (2006.01) |
| G01M 3/26 | (2006.01) |
| F16D 55/00 | (2006.01) |

(52) U.S. Cl.
CPC ........... *G01M 3/26* (2013.01); *F16D 65/0068* (2013.01); *F16D 2055/0016* (2013.01); *F16D 65/0087* (2013.01)

(58) Field of Classification Search
CPC .................. G01M 3/26; F16D 65/0016; F16D 65/0068; F16D 65/0087
USPC ....... 188/71.7–71.9, 72.7–72.9, 73.44, 73.45
See application file for complete search history.

(56) References Cited

U.S. PATENT DOCUMENTS

| 3,885,392 A * | 5/1975 | Haraikawa | B60T 11/20 |
| | | | 60/581 |
| 4,491,203 A | 1/1985 | Monick | |
| 4,620,617 A | 11/1986 | Weber | |
| 4,690,253 A | 9/1987 | Weber | |
| 4,958,654 A | 9/1990 | Hoffman, Jr. et al. | |
| 6,276,494 B1 | 8/2001 | Ward et al. | |
| 6,354,407 B1 | 3/2002 | Heinlein et al. | |
| 6,607,059 B1 | 8/2003 | Kapaan et al. | |
| 6,659,236 B1 | 12/2003 | Clark et al. | |
| 6,691,837 B1 | 2/2004 | Kapaan et al. | |
| 7,337,881 B1 * | 3/2008 | Sherman, II | F16D 55/22655 |
| | | | 188/72.4 |
| 8,539,819 B2 * | 9/2013 | Ciolkosz | B01D 15/163 |
| | | | 210/741 |
| 8,783,425 B2 * | 7/2014 | Isono | F16D 55/22655 |
| | | | 188/73.44 |
| 9,599,177 B2 | 3/2017 | Yasui et al. | |

(Continued)

FOREIGN PATENT DOCUMENTS

| CN | 101871835 A1 | 10/2010 |
| DE | 102008037774 B3 | 2/2010 |

(Continued)

OTHER PUBLICATIONS

Extended European Search Report dated Jul. 5, 2023 for related European Appln. No. 23155756.2; 6 Pages.

(Continued)

*Primary Examiner* — Christopher P Schwartz
(74) *Attorney, Agent, or Firm* — Brooks Kushman PC (57) ABSTRACT

A brake caliper housing and a method of checking sealing of a brake caliper housing. The brake caliper housing may include a cavity, a guide pin opening, and an internal passage. The guide pin opening may receive a guide pin that facilitates sliding movement of the brake caliper housing. The internal passage may extend from the cavity to the guide pin opening.

21 Claims, 7 Drawing Sheets

(56) References Cited

U.S. PATENT DOCUMENTS

| | | |
|---|---|---|
| 2003/0085082 A1 | 5/2003 | Severinsson et al. |
| 2003/0173164 A1 | 9/2003 | Angerfors |
| 2005/0284709 A1 | 12/2005 | Sandberg |
| 2012/0325596 A1 | 12/2012 | Malki et al. |
| 2013/0008749 A1 | 1/2013 | Sandberg et al. |
| 2013/0256076 A1 | 10/2013 | Malki et al. |
| 2015/0354645 A1 | 12/2015 | Cann |
| 2019/0001950 A1* | 1/2019 | Bourlon .............. F16D 55/226 |
| 2019/0024740 A1 | 1/2019 | Taylor et al. |
| 2019/0024742 A1 | 1/2019 | Taylor |
| 2019/0063530 A1 | 2/2019 | Kulkarni et al. |
| 2019/0331181 A1 | 10/2019 | Kulkarni et al. |
| 2019/0331184 A1 | 10/2019 | Taylor et al. |
| 2019/0331185 A1 | 10/2019 | Shah et al. |
| 2023/0202448 A1* | 6/2023 | Philpott ............. F16D 65/0068 73/49.3 |

FOREIGN PATENT DOCUMENTS

| | | |
|---|---|---|
| DE | 102010011725 A1 | 9/2011 |
| DE | 202013102651 U1 | 7/2013 |
| DE | 102018121859 A1 | 3/2020 |
| EP | 0190453 A2 | 8/1986 |
| EP | 0190705 A2 | 8/1986 |
| GB | 2474301 A | 4/2011 |

OTHER PUBLICATIONS

Philpott, Daniel, "System and Method of Checking Sealing of a Brake Caliper Housing"—U.S. Appl. No. 17/023,102, filed Sep. 16, 2020; 36 pages.

Article 94(3) EPC Communication dated Jul. 3, 2024 for related European Application No. 23155756.2; 5 Pages.

* cited by examiner

BRAKE CALIPER HOUSING AND A METHOD OF CHECKING SEALING OF SAME

TECHNICAL FIELD

This disclosure relates to a brake caliper housing and method of checking sealing of a brake caliper housing.

BACKGROUND

A system and method of checking sealing of a brake caliper housing is disclosed in U.S. patent application Ser. No. 17/023,102.

SUMMARY

In at least one embodiment, a method of checking sealing of a brake caliper housing is provided. The method may include providing a brake assembly that has brake caliper housing that is slidable with respect to a guide pin. The brake caliper housing may define a cavity, a guide pin opening that receives the guide pin, and an internal passage that extends from the cavity to the guide pin opening. A pressure check device may be fluidly connected to the cavity. A sealing condition may be determined with the pressure check device after changing the pressure of fluid inside the cavity.

In at least one embodiment, a brake caliper housing is provided. The brake caliper housing may include a body that defines a cavity, a first guide pin opening, and a first internal passage. The first guide pin opening may be spaced apart from the cavity and may be adapted to receive a first guide pin that facilitates sliding movement of the brake caliper housing. The first internal passage may extend from the cavity to the first guide pin opening to fluidly connect the cavity to the first guide pin opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
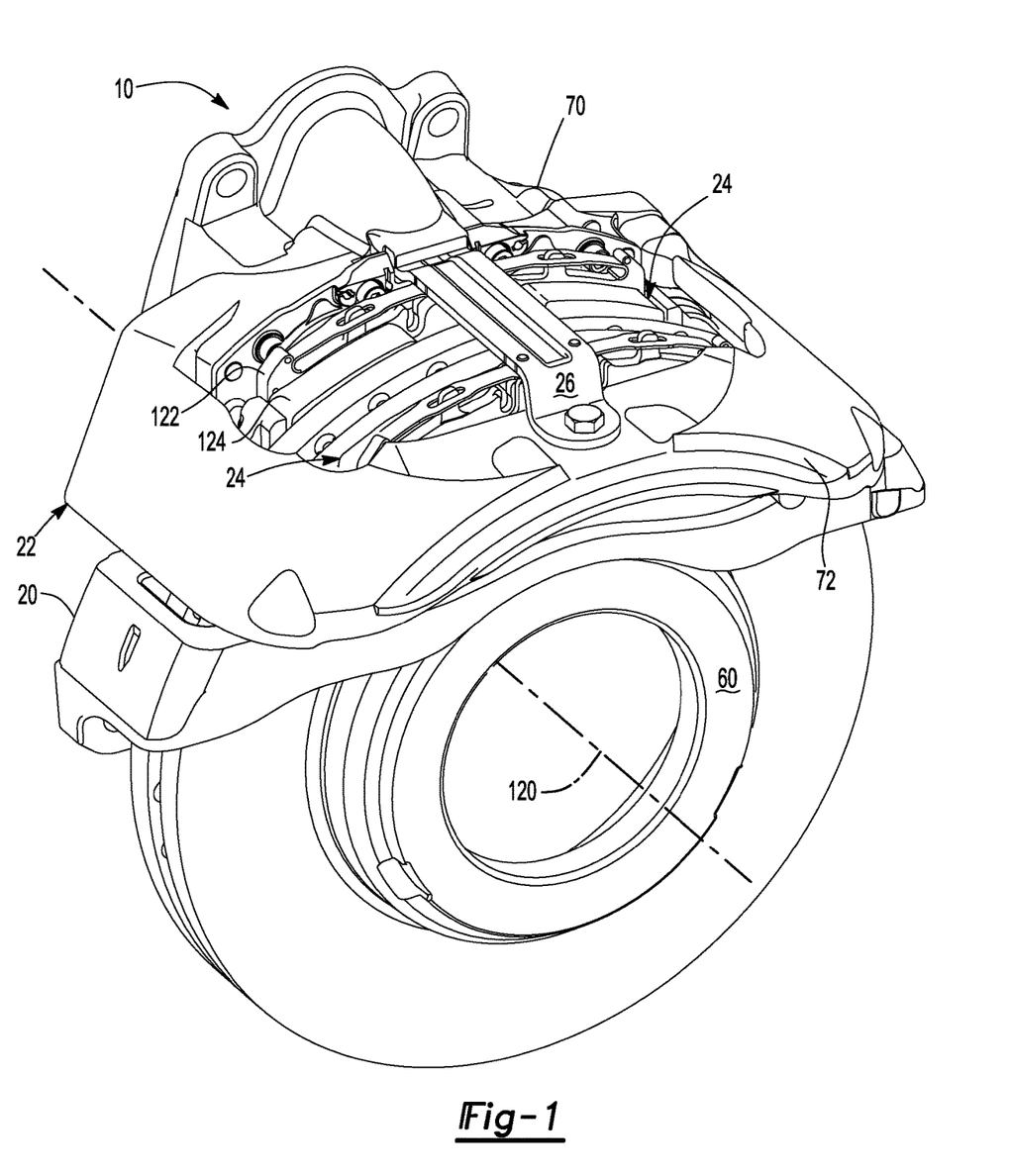
FIG. 1 is a perspective view of an example of a brake assembly.
Figure 7:
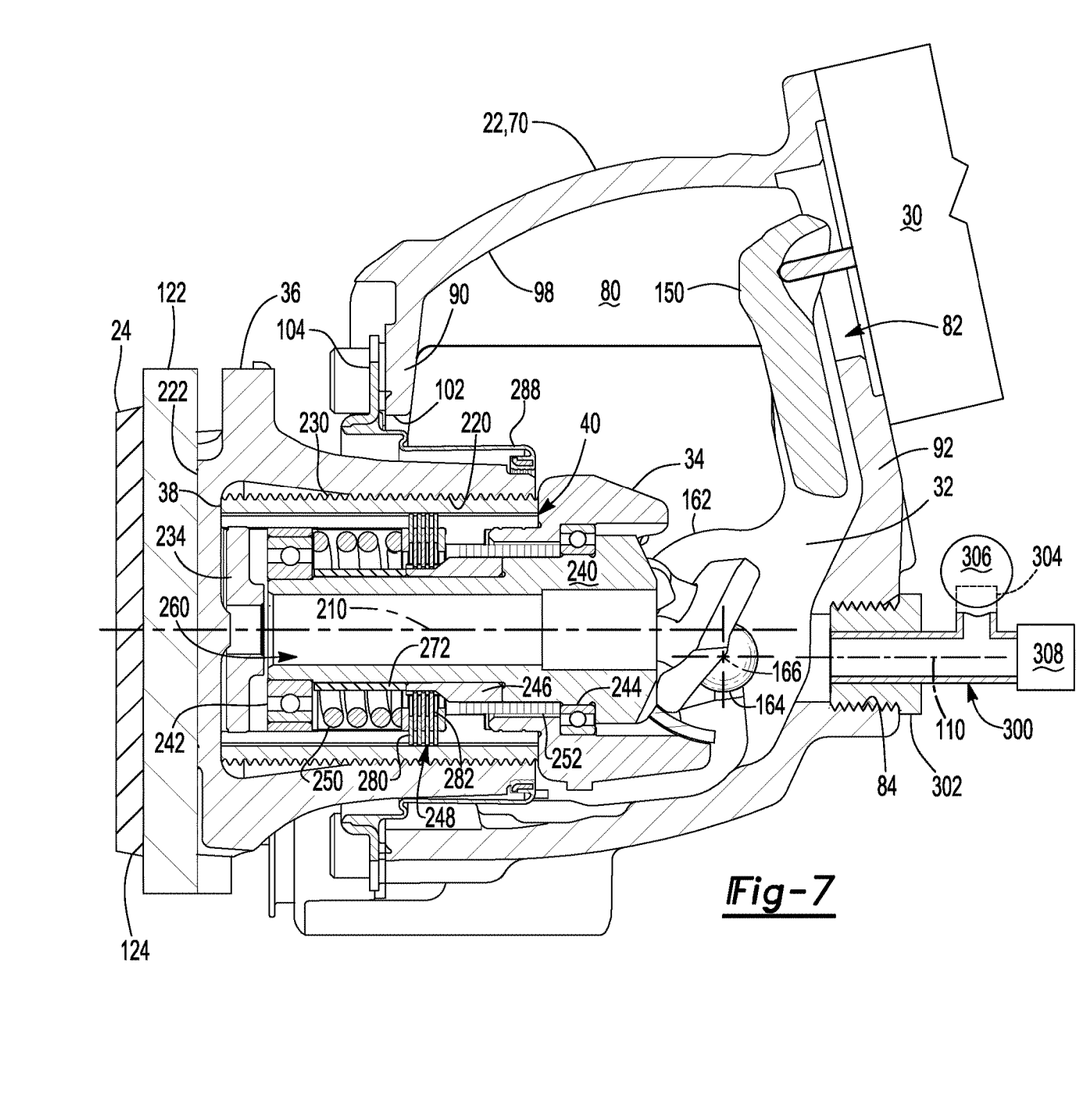
FIG. 7 is section view of a portion of the brake assembly along section line 7-7.

Referring to FIG. 1, an example of a brake assembly 10 is shown. The brake assembly 10 may be provided as part of a vehicle, such as a motor vehicle like a truck, bus, farm equipment, military transport or weaponry vehicle, cargo loading equipment for land, air, or marine vessels, or a trailer. The brake assembly 10 may be configured as a disc brake. In at least one configuration, the brake assembly 10 may include a brake carrier 20, a brake caliper 22, a pair of brake pad assemblies 24, and optionally a retainer bracket 26. Referring primarily to FIG. 7, the brake assembly 10 may include components that may facilitate movement of the brake pad assemblies 24, such as one or more guide pin assemblies 28, a brake actuator 30, an operating shaft 32, a yoke 34, a tappet 36, a piston 38, and a wear adjuster mechanism 40.

Referring to FIG. 1, the brake carrier 20 may be configured to be fixedly mounted to the vehicle. For example, the brake carrier 20 may be directly or indirectly mounted to an axle assembly or a steering knuckle. The brake carrier 20 may receive and support the brake pad assemblies 24 in a manner that permits the brake pad assemblies 24 to move along an axis toward and away from the brake rotor 60 while inhibiting rotation of the brake pad assemblies 24 about the axis. For instance, the brake carrier 20 may engage multiple sides of a brake pad assembly 24, such as left, right, and bottom sides. The brake carrier 20 may include a rotor opening that may receive a brake rotor 60. As such, the brake carrier 20 may straddle the brake rotor 60 and help position the brake pad assemblies 24 on opposite sides of the brake rotor 60.

Figure 2:
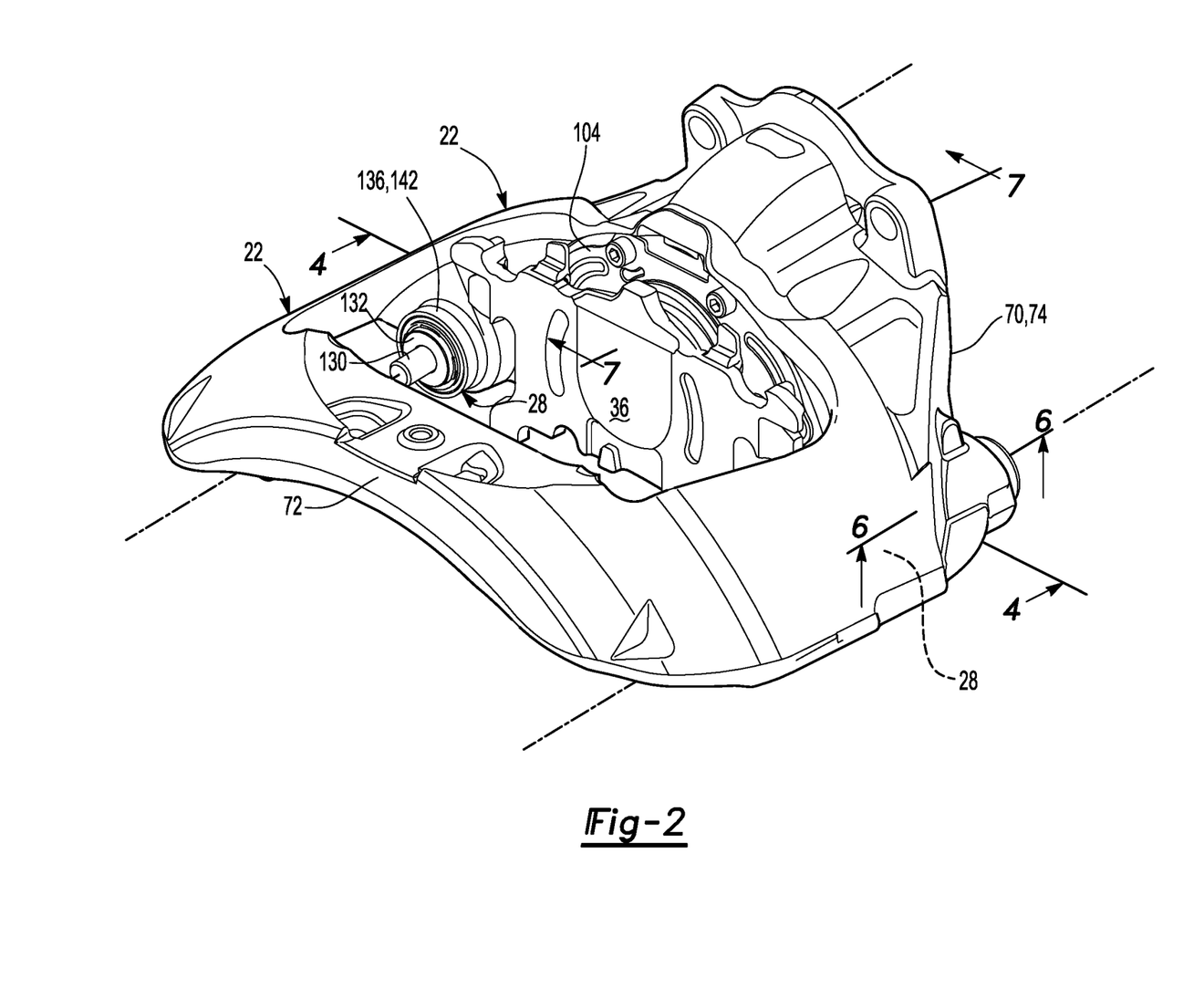
FIG. 2 is a perspective view of a portion of the brake assembly including an example of a brake caliper housing.

Referring to FIGS. 1 and 2, the brake caliper 22 may receive various components of the brake assembly 10. In addition, the brake caliper 22 may facilitate positioning of the brake pad assemblies 24 with respect to the brake rotor 60 to facilitate braking of the vehicle. In at least one configuration, the brake caliper 22 may be mounted to the brake carrier 20 and may include a caliper housing 70 and a caliper bridge 72.

Referring primarily to FIG. 2, the caliper housing 70, which may also be referred to as a brake caliper housing, may be moveably disposed on the brake carrier 20. For example, the caliper housing 70 may be slidably disposed on a pair of guide pin assemblies 28 that may be fixedly coupled to the brake carrier 20. An example of a guide pin assembly 28 is shown in more detail in FIG. 6. As is best shown in FIG. 7, the caliper housing 70 may facilitate mounting of the brake actuator 30. As is best shown in FIGS. 4 and 5, the caliper housing 70 may have a body 74 that may define a cavity 80, an opening 82, a hole 84, at least one guide pin opening 86, and at least one internal passage 88.

The body 74 of the caliper housing 70 may be configured as a unitary one-piece component. The body 74 may be integrally formed with the caliper bridge 72 or the body 74 and the caliper bridge 72 may be separate parts that may be fastened together.

Figure 4:
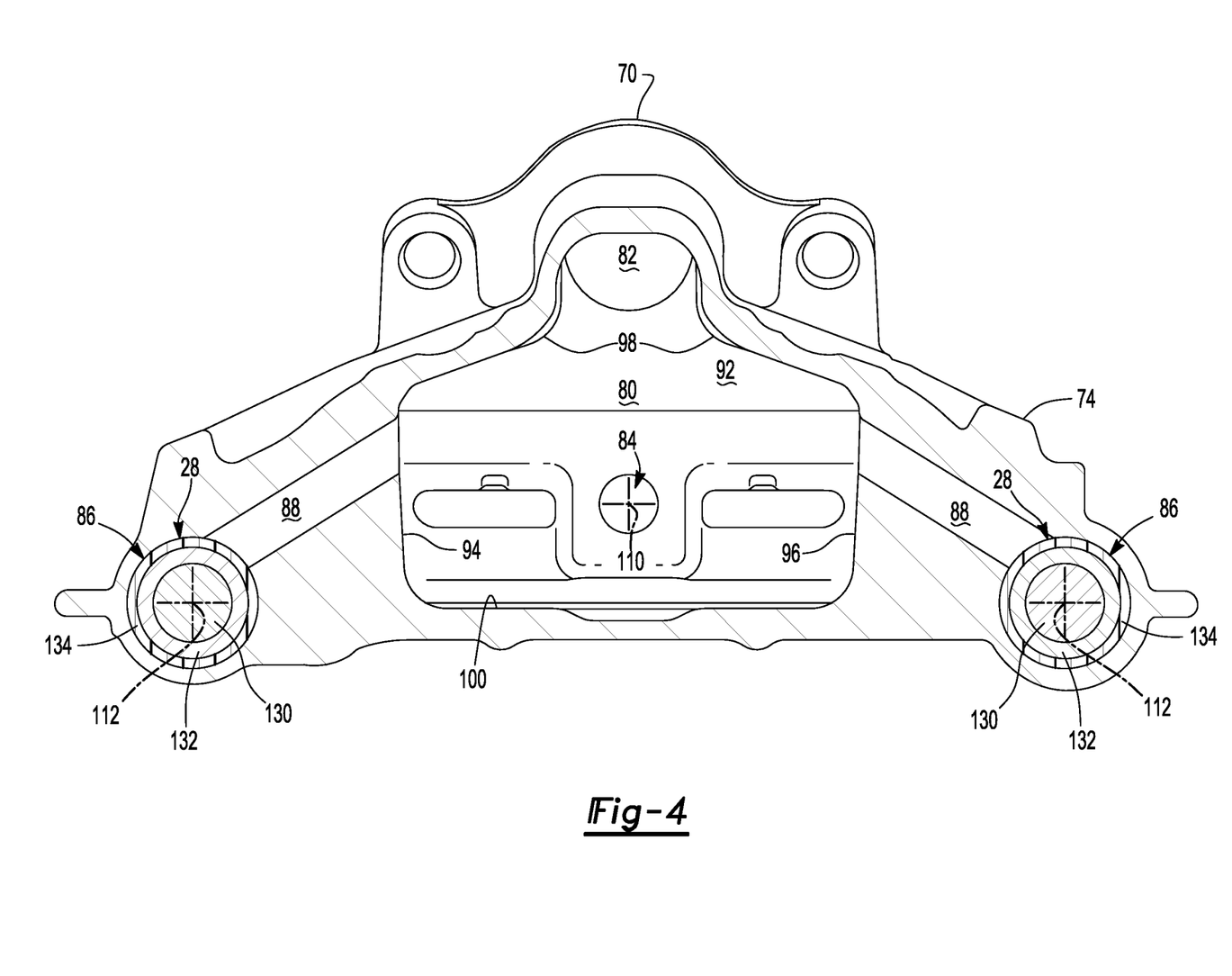
FIG. 4 is a section view of a portion of the brake assembly along section line 4-4 that show examples internal passages that extend from a cavity to a corresponding guide pin opening.
Figure 5:
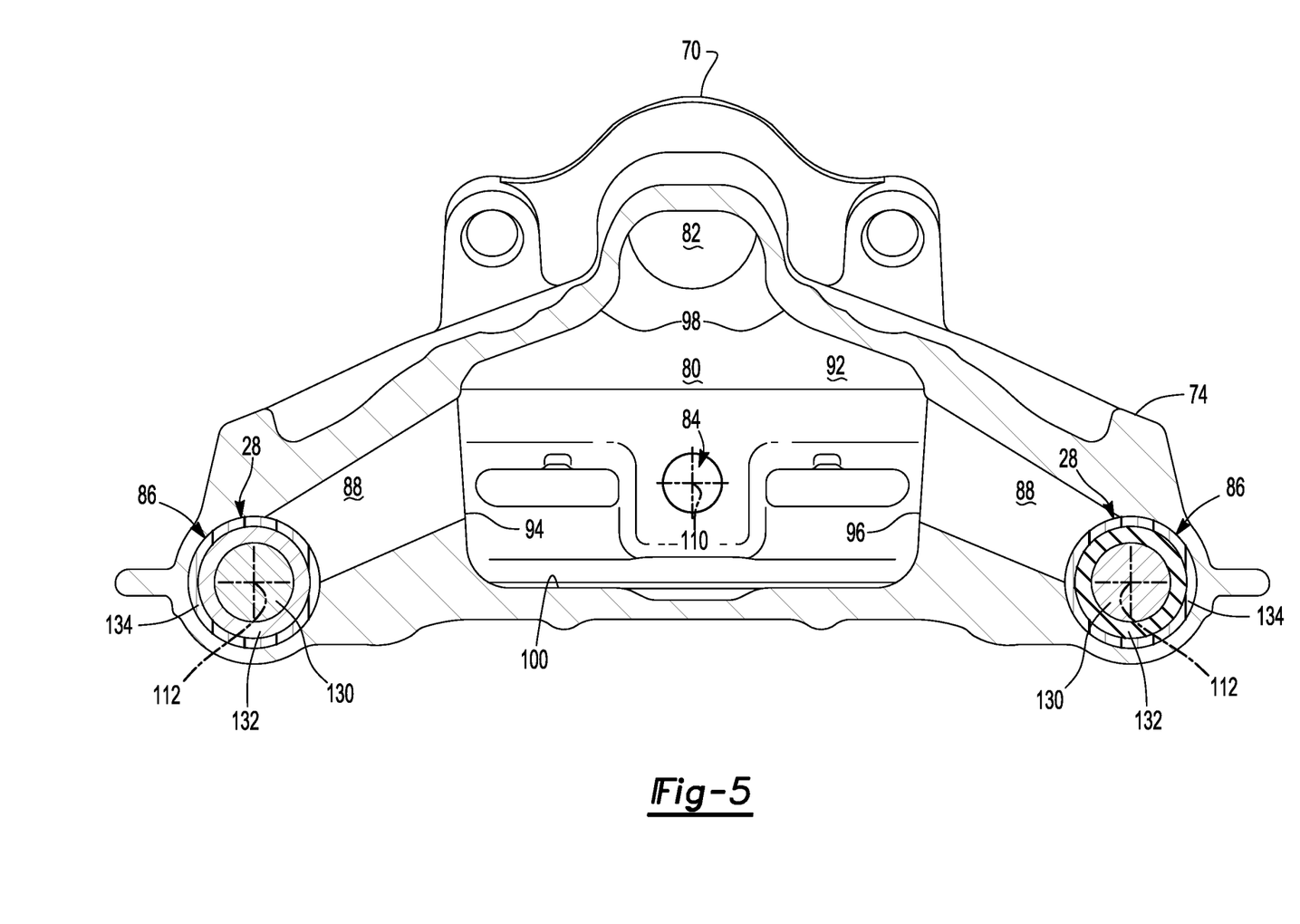
FIG. 5 is a section view of a portion of the brake assembly showing additional examples of internal passages.

Referring to FIGS. 4, 5, and 7, the cavity 80 may receive or partially receive various components that facilitate movement of the brake pad assemblies 24, such as the operating shaft 32, yoke 34, tappet 36, piston 38, and the wear adjuster mechanism 40. The cavity 80 may be at least partially defined by various walls of the caliper housing 70 or sides of the body 74, such as a front wall 90 (best shown in FIG.

7), a back wall 92, a first lateral cavity side 94, a second lateral cavity side 96, a top cavity side 98, and a bottom cavity side 100.

Referring to FIG. 7, the front wall 90 may face toward the brake carrier 20, a back side of a brake pad assembly 24, and the brake rotor 60. The front wall 90 may define an aperture 102 of the cavity 80. The aperture 102 may be at least partially enclosed by a cover plate 104 that may be fixedly mounted to the caliper housing 70, such as with fasteners like bolts. The front wall 90 may be disposed opposite the back wall 92.

Referring to FIGS. 4, 5, and 7, the back wall 92 may face away from the brake carrier 20 and the brake rotor 60. The back wall 92 may define the opening 82 and the hole 84.

Referring to FIGS. 4 and 5, the first lateral cavity side 94 may be disposed at a first lateral end of the cavity 80. The first lateral cavity side 94 may extend between the front wall 90 and the back wall 92.

The second lateral cavity side 96 may be disposed at a second lateral end of the cavity 80. As such, the second lateral cavity side 96 may be disposed opposite the first lateral cavity side 94. The second lateral cavity side 96 may extend between the front wall 90 and the back wall 92.

The top cavity side 98 may be disposed proximate the top of the cavity 80. The top cavity side 98 may extend between the front wall 90 and the back wall 92. The top cavity side 98 may also extend between the first lateral cavity side 94 and the second lateral cavity side 96. For instance, the top cavity side 98 may extend from a first end of the first lateral cavity side 94 to a first end of the second lateral cavity side 96.

The bottom cavity side 100 may be disposed opposite the top cavity side 98. The bottom cavity side 100 may extend between the front wall 90 and the back wall 92. The bottom cavity side 100 may also extend between the first lateral cavity side 94 and the second lateral cavity side 96. For instance, the bottom cavity side 100 may extend from a second end of the first lateral cavity side 94 to a second end of the second lateral cavity side 96.

Referring to FIGS. 4 and 7, the opening 82 may extend from the cavity 80 through the back wall 92 of the caliper housing 70. In at least one configuration, a shaft of the brake actuator 30 may extend through the opening 82 to facilitate actuation of the operating shaft 32. The opening 82 may be disposed above an axis 210.

The hole 84 may be a through hole that may extend from the cavity 80 through the back wall 92 of the caliper housing 70. The hole 84 may be spaced apart from the opening 82. The hole 84 may be disposed above a brake rotor axis of rotation 120, which is best shown in FIG. 1, and below the axis 210. The hole 84 may receive a plug, fitting, or combinations thereof as will be discussed in more detail below. The hole 84 may extend along a through hole axis 110.

Referring to FIGS. 4 and 5, at least one guide pin opening 86 may be defined by the body 74 of the caliper housing 70. In the configuration shown, two guide pin openings 86 are provided that are spaced apart from each other and positioned on opposite sides of the cavity 80. Each guide pin opening 86 may receive a corresponding guide pin assembly 28 that facilitates sliding movement of the caliper housing 70 with respect to the brake carrier 20 as will be discussed in more detail below. Each guide pin opening 86 may be configured as a through hole that may be spaced apart from the cavity 80 and that may extend along a guide pin axis 112. The guide pin axes 112 may be disposed substantially parallel to each other. The term "substantially parallel" as used herein means the same as or very close to parallel and includes features or axes that are within ±3° of being parallel each other.

At least one internal passage 88 may be defined by the body 74 of the caliper housing 70. In the configuration shown, two internal passages 88 are illustrated. An internal passage 88 may be disposed inside the body 74 and may extend from the cavity 80 to a guide pin opening 86. For instance, a first internal passage 88 may extend from the cavity 80 to the first guide pin opening 86 to fluidly connect the cavity 80 to the first guide pin opening 86. Similarly, a second internal passage 88 may extend from the cavity 80 to the second guide pin opening 86 to fluidly connect the cavity 80 to the second guide pin opening 86. In at least one configuration, the first internal passage 88 may be spaced apart from and may not intersect the second internal passage 88.

Figure 6:
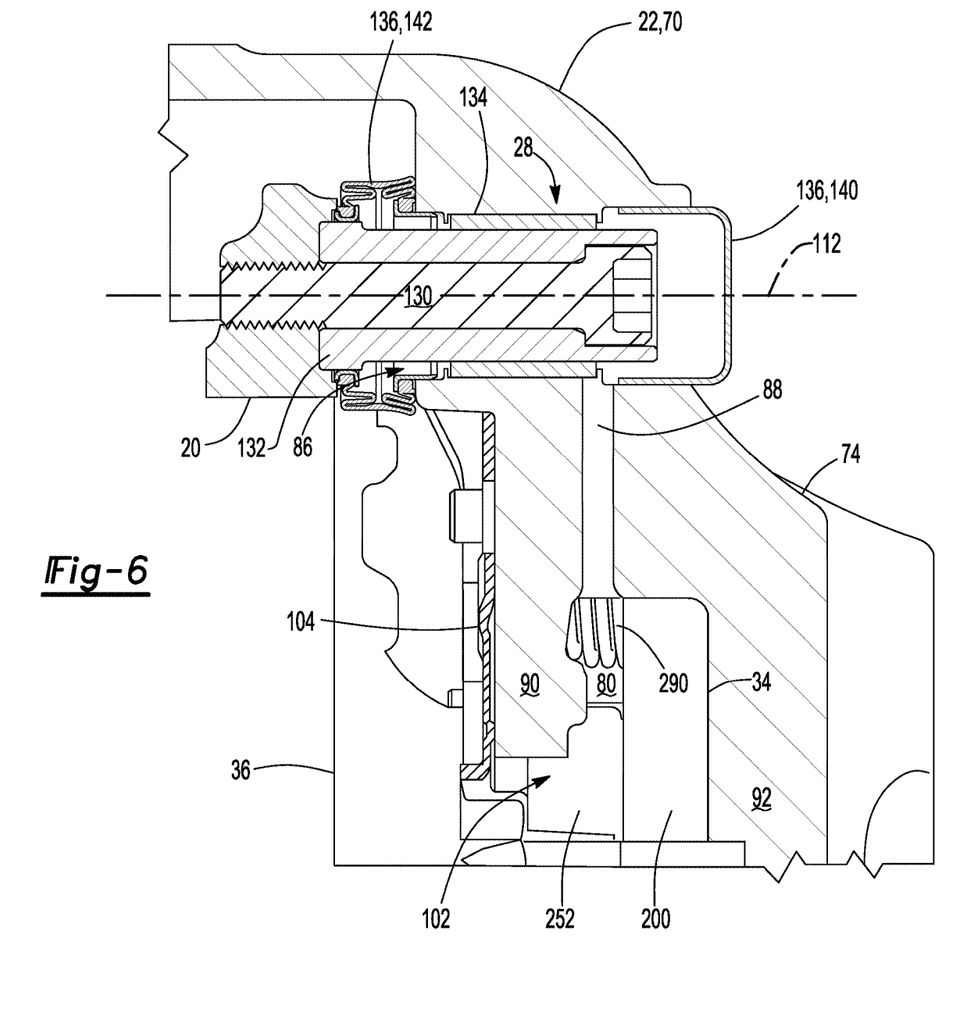
FIG. 6 is section view of a portion of the brake assembly along section line 6-6.

The internal passages 88 may generally extend laterally outboard and away from the center of the cavity 80. As such, the internal passages 88 may extend away from the through hole axis 110. For instance, the first internal passage 88 may extend from the first lateral cavity side 94 to the first guide pin opening 86. The second internal passage 88 may extend from the second lateral cavity side 96 to the second guide pin opening 86. In at least one configuration, the first internal passage 88, the second internal passage 88, or both may be disposed proximate the top cavity side 98. For instance, the first internal passage 88, the second internal passage 88, or both may be disposed proximate a top end of the first lateral cavity side 94 and the second lateral cavity side 96. As such, the ends of the internal passages 88 that are located adjacent to the cavity 80 may be disposed above the guide pin openings 86. As is best shown in FIG. 6, an internal passage 88 may be axially positioned between the front wall 90 and the back wall 92 of the caliper housing 70.

An internal passage 88 may be provided in various configurations. In the configuration shown in FIG. 4, the internal passages 88 are illustrated as having a substantially constant height or shape from end to end. In the configuration shown in FIG. 5, the internal passages 88 are illustrated as having a height or shape that varies. For instance, an internal passage 88 may become progressively narrower as the internal passage 88 extends from the cavity 80 toward a corresponding guide pin opening 86.

Referring to FIGS. 1 and 2, the caliper bridge 72 may be integrally formed with the caliper housing 70 or may be a separate part that is fixedly disposed on the caliper housing 70. For example, the caliper bridge 72 may be coupled to the caliper housing 70 with one or more fasteners, such as bolts. In at least one configuration, the caliper bridge 72 may cooperate with the caliper housing 70 to at least partially define an opening that may facilitate insertion and removal of the brake pad assemblies 24.

Referring to FIG. 1, a pair of brake pad assemblies 24 may be received in and may be supported by the brake carrier 20. The brake pad assemblies 24 may be disposed on opposite sides of the brake rotor 60 and may be engageable with the brake rotor 60 to slow rotation of the brake rotor 60 and an associated wheel about a brake rotor axis of rotation 120. One brake pad assembly 24 may be positioned between the caliper housing 70 and the brake rotor 60 and may be referred to as an inboard brake pad assembly 24. The brake pad assembly 24 located on the opposite side of the brake rotor 60 may be positioned between the caliper bridge 72 and the brake rotor 60 and may be referred to as an outboard brake pad assembly 24. The brake pad assemblies 24 may include a backplate 122 and friction material 124.

The backplate 122 may be a structural member of a brake pad assembly 24. The backplate 122 may be configured as a generally flat plate and may be made of any suitable material, such as metal or a metal alloy. As is best shown in FIG. 7, a side of the backplate 122 that faces away from the friction material 124 may engage or contact the tappet 36.

The friction material 124 may be disposed on a side of the backplate 122 that may face toward the brake rotor 60. The friction material 124 may contact the brake rotor 60 during vehicle braking.

Referring to FIG. 1, the retainer bracket 26 may be removably mounted to the brake caliper 22. For example, the retainer bracket 26 may extend across the brake pad assemblies 24 and the opening in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening.

Referring to FIG. 6, one or more guide pin assemblies 28 may slidably couple the caliper housing 70 to the brake carrier 20 such that the caliper housing 70 may slide along the guide pin axis 112 with respect to at least a portion of the guide pin assembly 28. A guide pin assembly 28 may extend from the brake carrier 20 into a corresponding guide pin opening 86. A guide pin assembly 28 may have any suitable configuration. For instance, a guide pin assembly 28 may include a fastener 130, a sleeve 132, and at least one bushing 134. In addition, one or more sealing components 136 may be provided with or associated with a guide pin assembly 28 to help isolate a guide pin opening 86 and components that may be received in the guide pin opening 86 from the surrounding environment.

The fastener 130 may fixedly couple the sleeve 132 to the brake carrier 20. The fastener 130 may have any suitable configuration. For instance, the fastener 130 may be configured as a bolt, such as a carriage bolt, that may be received in a fastener hole of the brake carrier 20. For instance, the fastener 130 and the fastener hole of the brake carrier 20 may have mating threads. The fastener 130 may be partially received in the guide pin opening 86 of the caliper housing 70 and may extend along or around the guide pin axis 112.

The sleeve 132 may receive the fastener 130. For instance, the sleeve 132 may be configured as a hollow tube that may receive the fastener 130 and that may be at least partially received in the guide pin opening 86 of the caliper housing 70. The hollow portion of the sleeve 132 that may receive the fastener 130 may be sized slightly larger than the fastener 130 so as to permit insertion and rotation of the fastener 130 for assembly purposes but may otherwise generally center the sleeve 132 about the guide pin axis 112. The sleeve 132 may be fixedly positioned or stationary with respect to the brake carrier 20. The sleeve 132 may extend from and may engage or contact the brake carrier 20. Alternatively, the sleeve 132 may be separated from the brake carrier 20 by an intervening component.

One or more bushings 134 may be received or partially received in the guide pin opening 86. A bushing 134 may encircle the sleeve 132 and may extend from the sleeve 132 to the caliper housing 70. A bushing 134 may facilitate sliding of the caliper housing 70 along the guide pin axis 112 and with respect to the brake carrier 20. For example, the bushing 134 may be slidable with respect to the sleeve 132. A bushing 134 may have any suitable configuration. For instance, a bushing may be configured as a hollow cylinder.

One or more sealing components 136 may be provided to help separate the guide pin opening 86 from the surrounding environment. For instance, a sealing component 136 may inhibit contaminants such as particulates and moisture or water from entering the guide pin opening 86, thereby helping maintain smooth sliding movement of the caliper housing 70 and inhibiting corrosion of internal components. A sealing component 136 may be completely received inside the guide pin opening 86, partially received inside the guide pin opening 86, or may be located outside the guide pin opening 86. A sealing component 136 may have any suitable configuration. For instance, a sealing component 136 may be configured as a seal, such as an O-ring, that may encircle the sleeve 132 and may extend from the sleeve to the caliper housing 70 or and intervening component. Alternatively or in addition, a sealing component 136 may be configured as a cover, cap, boot, or the like. In the configuration shown in FIG. 6, one sealing component 136 is configured as a cap 140 while the other sealing component is configured as a flexible boot 142.

The cap 140 may be provided to cover the end of the guide pin opening 86 that faces away from the brake carrier 20. In at least one configuration, the cap 140 may be received in the guide pin opening 86. The cap 140 may partially receive the guide pin assembly 28.

The flexible boot 142 may extend between the brake carrier 20 and the brake caliper 22 or between the guide pin assembly 28 and the caliper housing 70. The flexible boot 142 may flex or change in length in response to movement of the brake caliper 22. For instance, the flexible boot 142 may expand or unfold when the brake caliper 22 moves in a first direction with respect to the brake carrier 20 and may contract or fold when the brake caliper 22 moves in a second direction with respect to the brake carrier 20.

Referring to FIG. 7, the brake actuator 30 may be mounted to the brake carrier 20. In at least one configuration, the brake actuator 30 may be mounted to the back wall 92 of the caliper housing 70 and may have a brake actuator shaft that may extend through the opening 82 in the caliper housing 70. The brake actuator shaft may engage the operating shaft 32 and may be moveable to rotate the operating shaft 32.

Figure 3:
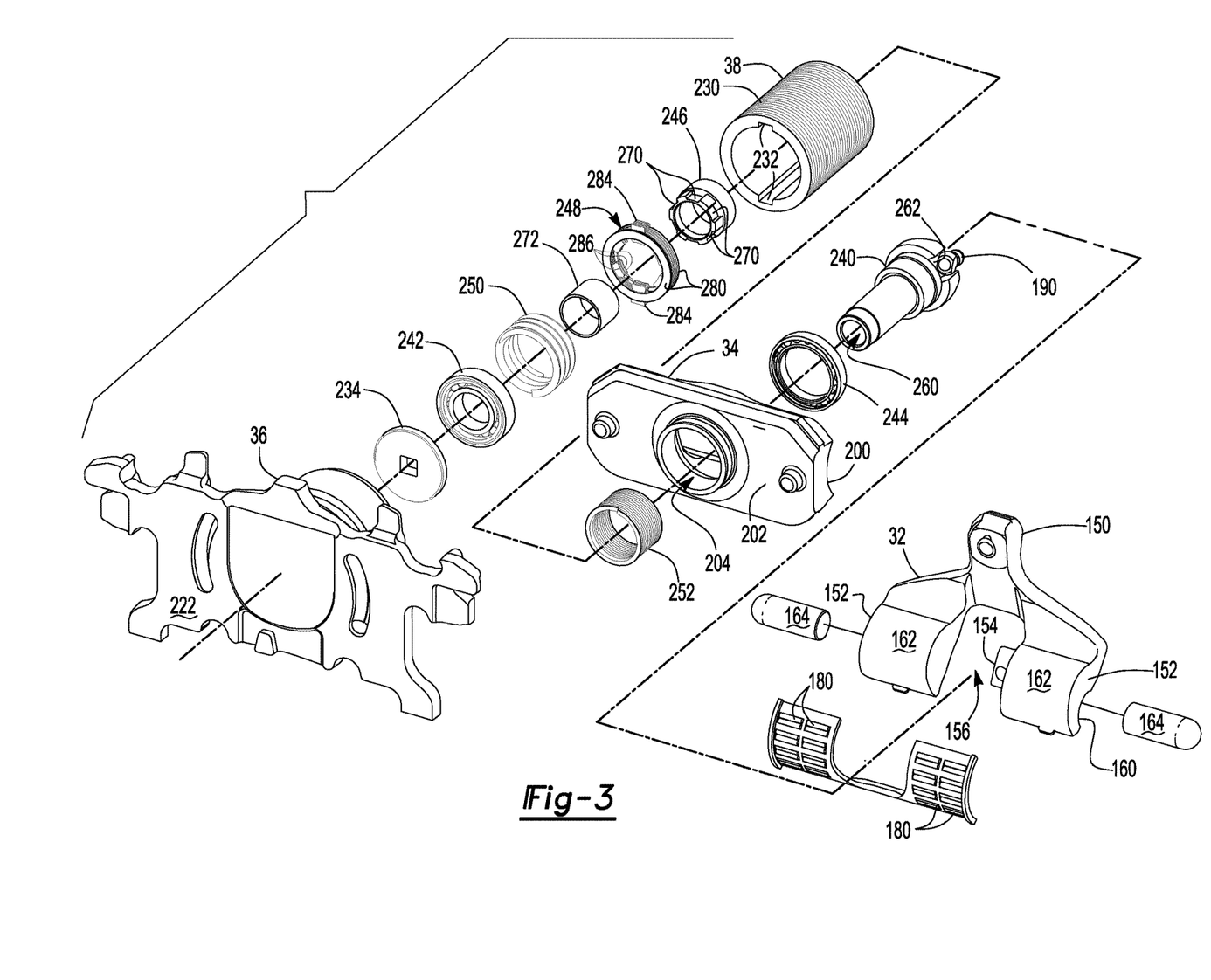
FIG. 3 is an exploded view of a portion of the brake assembly.

Referring to FIGS. 3 and 7, the operating shaft 32 may transmit force from the brake actuator 30 other moveable components of the brake assembly 10. In at least one configuration, the operating shaft 32 may generally be configured as an inverted "Y" and may include a lever 150, a pair of cams 152, and a tab 154.

Referring primarily to FIG. 3, the lever 150 may extend from the cams 152 toward the opening 82 of the caliper housing 70. The lever 150 may have a pocket that may receive an end of the brake actuator shaft.

The cams 152 may be spaced apart from each other such that a gap 156 is provided between the cams 152. In at least one configuration, the cams 152 may have mirror symmetry with respect to each other. In at least one configuration, a cam 152 may include a concave recess 160 and a convex surface 162.

The concave recess 160 may receive a corresponding roller 164. The roller 164 may be supported by a corresponding arcuate surface in the cavity 80 of the caliper housing 70 and may be rotatable about a roller axis of rotation 166, which is best shown in FIG. 7.

Referring to FIG. 3, the convex surface 162 may be disposed opposite the concave recess 160. The convex surface 162 may engage a corresponding set of roller bearings 180 that may be disposed between the convex surface 162 and the yoke 34. The rollers 164 and roller bearings 180 may facilitate rotation of the operating shaft 32 about an axis of rotation. The operating shaft axis of rotation may be disposed at a radial centerline of the convex surface 162.

The tab 154 may extend from at least one of the cams 152 into the gap 156. A ball pin 190 may be fixedly mounted to the tab 154 and may extend toward the wear adjuster mechanism 40 as will be discussed in more detail below. In at least one configuration, the ball pin 190 may have a generally spherical or rounded ball at its distal end.

The yoke 34 may be disposed between the operating shaft 32 and the piston 38. In at least one configuration, the yoke 34 may include a concave surface 200, an engagement surface 202, and a through hole 204.

The concave surface 200 may face toward the operating shaft 32 and may engage the roller bearings 180.

The engagement surface 202 may be disposed opposite the concave surface 200. The engagement surface 202 may engage or contact an end of the piston 38.

The through hole 204 may be disposed proximate the center of the yoke 34 and may receive at least a portion of the wear adjuster mechanism 40. The through hole 204 may extend around an axis 210, which is best shown in FIG. 7. The axis 210 may be offset from and may extend substantially parallel to the brake rotor axis of rotation 120.

Referring to FIGS. 3 and 7, the tappet 36 may be moveable along the axis 210 with respect to the caliper housing 70. However, the brake carrier 20 may inhibit or prevent the tappet 36 from rotating about the axis 210. As is best shown in FIG. 7, the tappet 36 may protrude away from the cavity 80 of the caliper housing 70 and may have a generally hollow body that may include an inner female thread 220 and an engagement face 222.

The inner female thread 220 may face toward the axis 210 and may extend around the axis 210.

The engagement face 222 may face away from the cavity 80. The engagement face 222 may engage or contact a brake pad assembly 24. For example, the engagement face 222 may engage or contact a side of the backplate 122 that may be disposed opposite the friction material 124.

The piston 38 may be at least partially received inside the tappet 36. The piston 38 may be moveable along the axis 210. In addition, the piston 38 may be rotatable about the axis 210. In at least one configuration and as is best shown in FIG. 3, the piston 38 may have a hollow tubular configuration that may include an outer female thread 230, at least one recess 232, and an end cap 234. The brake assembly 10 may be provided with a single piston 38 in one or more configurations.

The outer female thread 230 may face away from the axis 210 and may extend around the axis 210. The outer female thread 230 may mate with the inner female thread 220 of the tappet 36. As such, the tappet 36 and the piston 38 may have mating threads.

At least one recess 232 may be provided in an inner surface of the piston 38 that may be disposed opposite the outer female thread 230 and that may face toward the axis 210. In the configuration shown, two recesses 232 are provided that are disposed opposite each other and extend the length of the piston 38. The recesses 232 may facilitate mounting of a disc pack of the wear adjuster mechanism 40 as will be discussed in more detail below.

Referring to FIGS. 3 and 7, the end cap 234 may be disposed at an end of the piston 38 that may face toward the brake pad assembly 24 and the tappet 36. The end cap 234 may be integrally formed with the body of the piston 38 or may be provided as a separate component. In the configuration shown, the end cap 234 is provided as a separate component that may be received in the hollow body of the piston 38. The end cap 234 may be fixed to the piston 38 such that the piston 38 is not rotatable with respect to the end cap 234.

Referring to FIG. 7, the wear adjuster mechanism 40 may be configured to maintain a desired running clearance between the brake pad assemblies 24 and the brake rotor 60 when the brake pad assemblies 24 are retracted. As an overview, the wear adjuster mechanism 40 may include a one-way clutch that may permit the axial position of a brake pad assembly along the axis 210 to be adjusted or move closer to the brake rotor 60 in response to wear of the friction material 124. The wear adjuster mechanism 40 may be provided in various configurations, some examples of which are disclosed in United States Patent Publication No. 2019/0024740, which is hereby incorporated by reference in its entirety. The wear adjuster mechanism 40 may be at least partially received inside the piston 38. In at least one configuration and as is best shown with reference to FIGS. 3 and 7, the wear adjuster mechanism 40 may include a shaft 240, a first bearing assembly 242, a second bearing assembly 244, a drum 246, a disc pack 248, a first biasing member 250, and a second biasing member 252.

The shaft 240 may be at least partially received in the cavity 80 of the caliper housing 70. The shaft 240 may be disposed in the through hole 204 of the yoke 34 and inside the hole or cavity of the piston 38. In addition, the shaft 240 may be spaced apart from the yoke 34 and the piston 38. The shaft 240 may be rotatable about the axis 210 and may define a shaft cavity 260 and a ball pin engagement feature 262.

The shaft cavity 260 may extend along the axis 210. In at least one configuration, the shaft cavity 260 may be configured as a through hole that may extend along the axis 210 from a first end of the shaft 240 to a second end of the shaft 240 that may be disposed opposite the first end of the shaft 240. A portion of the shaft cavity 260 that may be received inside the yoke 34 may have a larger diameter than a portion of the shaft cavity 260 that may be received inside the piston 38.

The ball pin engagement feature 262 may be configured to engage the ball pin 190. The ball pin engagement feature 262 may be disposed at an end of the shaft 240 that may face toward the operating shaft 32 and may be offset from the axis 210. In the configuration shown, the ball pin engagement feature 262 is configured as a recess that may receive the ball pin 190. The ball pin 190 may extend at an angle with respect to the axis 210 such that rotation of the operating shaft 32 may cause the ball pin 190 to engage a side or surface of the ball pin engagement feature 262 in a manner that may rotate the shaft 240 about the axis 210. It is also contemplated that the ball pin engagement feature 262 may have a male configuration and the ball pin 190 may have a female configuration in other configurations.

The first bearing assembly 242 may rotatably support the shaft 240. The first bearing assembly 242 may be disposed proximate a first end of the shaft 240 and may receive the shaft 240. For instance, the first bearing assembly 242 may extend around the shaft 240 and may be received inside the piston 38. As such, the first bearing assembly 242 may extend from the shaft 240 to or toward the inner surface of the piston 38.

The second bearing assembly 244 may rotatably support the shaft 240. The second bearing assembly 244 may be disposed proximate a second end of the shaft 240 and may receive the shaft 240. For instance, the second bearing assembly 244 may extend around the shaft 240 and may be received inside the through hole 204 of the yoke 34. As such, the second bearing assembly 244 may extend from the shaft 240 to or toward the yoke 34.

The drum 246 may be received inside the piston 38 and may be spaced apart from the piston 38. The drum 246 may extend around and may receive a portion of the shaft 240. In addition, the shaft 240 may be selectively rotatable about the axis 210 with respect to the drum 246 as will be discussed in more detail below. In at least one configuration, the drum 246 may have a hollow tubular construction that may include at least one recess 270. A plurality of recesses 270 may be arranged around an exterior side of the drum 246 that faces away from the axis 210. The recesses 270 may facilitate mounting of the disc pack 248. Axial movement of the drum 246 may be constrained by the shaft 240 and by a spacer 272 that may extend from an end of the drum 246 to the first bearing assembly 242.

The disc pack 248 may selectively couple the piston 38 and the drum 246. As is best shown in FIG. 7, the disc pack 248 may include a plurality of discs that may include at least one outer disc 280 and at least one inner disc 282. The outer discs 280 may have at least one tab 284 (best shown in FIG. 3) that may be received in a recess 232 of the piston 38. As such, the outer discs 280 may be rotatable about the axis 210 with the piston 38. The inner discs 282 may have at least one tab 286 that may be received in a recess 270 of the drum 246. As such, the inner discs 282 may be rotatable about the axis 210 with the drum 246. The outer discs 280 and the inner discs 282 may be arranged in an alternating order in an axial direction or in a direction that extends along the axis 210. For instance, at least one inner disc 282 may be axially positioned between two adjacent outer discs 280 or vice versa. The piston 38 may be rotatable about the axis 210 with the drum 246 when the discs of the disc pack 248 are sufficiently compressed such that the outer discs 280 and the inner discs 282 do not slip with respect to each other. Conversely, the drum 246 may be rotatable with respect to the piston 38 when the discs of the disc pack 248 are not sufficiently compressed or when the outer discs 280 and the inner discs 282 slip with respect to each other.

Referring to FIGS. 3 and 7, the first biasing member 250 may exert a biasing force on the disc pack 248. The first biasing member 250 may have any suitable configuration. For instance, the first biasing member 250 may be configured as a spring that may extend from the first bearing assembly 242 to the disc pack 248 and that may exert a biasing force on the disc pack 248 in a direction that may extend toward the yoke 34. As such, the first biasing member 250 may compress the discs of the disc pack 248.

The second biasing member 252 may selectively couple the shaft 240 and the drum 246. The second biasing member 252 may have any suitable configuration. For example, the second biasing member 252 may be configured as a wrap spring that may be axially positioned between the disc pack 248 and the second bearing assembly 244. The second biasing member 252 may be partially received inside the yoke 34 and may be partially received inside the piston 38. The second biasing member 252 may extend around the shaft 240 and may extend around a portion of the drum 246. The second biasing member 252 may be configured to slip and allow the shaft 240 to rotate with respect to the drum 246 and the piston 38 when the brake is released or braking is disengaged as will be discussed in more detail below.

Referring to FIG. 6, one or more retraction springs 290 may be provided to facilitate retraction of the brake pad assemblies 24. A retraction spring 290 may be received in the cavity 80 of the caliper housing 70 and may extend from the yoke 34 to the cover plate 104. The retraction spring 290 may be configured to actuate the yoke 34 away from the cover plate 104 since the cover plate 104 is fixed to the caliper housing 70. As such, the retraction spring 290 may urge the yoke 34 to move along the axis 210 in a direction that extends away from the brake rotor 60 and the cover plate 104.

Operation of the brake assembly 10 will now be described in more detail. As an overview, the brake assembly 10 may start in a retracted state in which braking of the vehicle is not requested. As such, the brake pad assemblies 24 may be retracted away from the brake rotor 60 and components of the brake assembly 10 may be positioned as shown. In response to a vehicle braking command, the brake actuator 30 may extend the brake actuator shaft, thereby rotating the operating shaft 32 about its axis of rotation in a first direction. Rotation of the operating shaft 32 may move the yoke 34, tappet 36, piston 38, wear adjuster mechanism 40, and the inboard brake pad assembly 24 that is disposed adjacent to the tappet 36 along the axis 210 toward the brake rotor 60. Movement of the yoke 34 toward the brake rotor 60 may compress the retraction springs. In addition, rotation of the operating shaft 32 may cause the ball pin 190 to engage the ball pin engagement feature 262 of the shaft 240, which may rotate the shaft 240 about the axis 210. Once the inboard brake pad assembly 24 contacts the brake rotor 60 a reaction force may then move the brake caliper 22 with respect to the brake carrier 20 to actuate the outboard brake pad assembly 24 that is disposed between the brake rotor 60 and the caliper bridge 72 into engagement with an opposite side of the brake rotor 60 to help slow rotation of the brake rotor 60 and an associated vehicle wheel. Retracting the brake actuator shaft may allow the operating shaft 32 to rotate about its axis of rotation in a second direction, which in turn may allow the actuation sequence to proceed in reverse under the biasing force of the retraction springs.

Rotation of the operating shaft 32 may or may not result in adjustment of the running clearance between the brake pad assembly 24 and the brake rotor 60. For example, rotation of the operating shaft 32 in the first direction may operate the wear adjuster mechanism 40 to extend the tappet 36 closer to the brake rotor 60 with respect to the piston 38 when the operating shaft 32 and the ball pin 190 rotate the shaft 240 about the axis 210 before the inboard brake pad assembly 24 contacts the brake rotor 60. As such, the shaft 240 and the drum 246 may rotate together about the axis 210 due to the force exerted by the second biasing member 252. Rotation of the drum 246 may cause the piston 38 to rotate about the axis 210 due to the coupling provided by the disc pack 248. Rotation of the piston 38 may extend the tappet 36 (i.e., extend the tappet 36 further away from the yoke 34 and closer to the brake rotor 60) due to the mating of the outer female thread 230 of the piston 38 and the inner female thread 220 of the tappet 36. For example, rotation of the piston 38 may cause the tappet 36 to extend to the left from the perspective shown with respect to the piston 38 due to operation of the mating threads since the tappet 36 is inhibited from rotating about the axis 210 by the brake carrier 20. Extension of the tappet 36 with respect to the piston 38 may stop when the inboard brake pad assembly 24 contacts the brake rotor 60. For example, the torque required to rotate the piston 38 increases substantially when the inboard brake pad assembly 24 contacts the brake rotor 60 even when the brake actuator 30 continues to rotate the operating shaft 32 and hence continues to rotate the shaft 240. As a result, the discs of the disc pack 248 may slip with respect to each other, thereby permitting rotation of the shaft 240 with respect to the piston 38.

The wear adjuster mechanism 40 may operate to hold the tappet 36 in its adjusted position when the brake pad assemblies 24 are retracted. For example, when the brake actuator 30 is retracted the operating shaft 32 may rotate in a second direction that is disposed opposite the first direction, or clockwise from the perspective shown. The ball pin 190 may then rotate the shaft 240 in the opposite direction back to its previous rotational position. However, the force exerted by the disc pack 248 may exceed the force exerted by the second biasing member 252. As a result, the disc pack 248 may inhibit rotation of the piston 38 about the axis 210 with respect to the drum 246 while the second biasing member 252 may slip or allow the shaft 240 to rotate about the axis 210 in the second direction with respect to the drum 246 and back to its previous position.

Rotation of the operating shaft 32 may not result in adjustment of the running clearance between the brake pad assembly 24 and the brake rotor 60 when the inboard brake pad assembly 24 contacts the brake rotor 60 before the operating shaft 32 and the ball pin 190 rotate the shaft 240 about the axis 210. As previously discussed, the torque required to rotate the piston 38 increases substantially when the inboard brake pad assembly 24 contacts the brake rotor 60. As a result, the discs of the disc pack 248 may slip with respect to each other as the operating shaft 32 rotates in the first direction, thereby permitting rotation of the shaft 240 with respect to the piston 38 while rotation of the piston 38 is opposed by the tappet 36 reacting against the brake rotor 60. The wear adjuster mechanism 40 may operate to hold the tappet 36 in its current position when the brake pad assemblies 24 are retracted (e.g., the disc pack 248 may inhibit rotation of the piston 38 about the axis 210 while the second biasing member 252 may slip or allow the shaft 240 to rotate about the axis 210 and back to its previous position as previously described).

Referring to FIG. 7, the cavity 80 inside the caliper housing 70 may be sealed from the surrounding environment to inhibit contaminants and moisture or water from entering the cavity 80. For example, the brake actuator 30 and the cover plate 104 may directly or indirectly seal against the caliper housing 70, such as with an intervening seal or gasket that may facilitate sealing of a corresponding opening of the caliper housing 70. Similarly, a flexible boot 288 may extend from the tappet 36 to the caliper housing 70 and/or the cover plate 104 to provide sealing between the tappet 36 and the caliper housing 70 while accommodating movement of the tappet 36. In addition, the hole 84 in the caliper housing 70 may receive a component such as a plug that may facilitate sealing as previously discussed.

Sealing of the cavity 80 may help prevent corrosion of components or surfaces inside the cavity 80 of the caliper housing 70. For example, moisture inside the cavity 80 can lead to corrosion of components inside the cavity 80 that facilitate movement like the operating shaft 32, yoke 34, tappet 36, piston 38, wear adjuster mechanism 40, rollers 164, roller bearings 180, or corrosion of surfaces that may support these components or that these components may move upon. A small amount of moisture may be present in the cavity 80 at the time of assembly due to water vapor in the air inside the cavity 80. However, the amount of moisture in the cavity 80 may change if there is leakage or a leak path between the cavity 80 and the surrounding outside environment, between the guide pin opening 86 and the surrounding environment, or both. For instance, leakage may occur around or through the brake actuator 30, cover plate 104, flexible boot 288, sealing component 136, or the like during use. A leak path may allow water or additional water vapor to enter the cavity 80, which may increase the potential for corrosion. Visual inspection of surfaces and components of the brake assembly 10 for a leak path and/or for corrosion is inherently subjective, is reliant upon the thoroughness of the visual inspection by an inspector, and is thus subject to error. In addition, visual inspection may require removal of a vehicle wheel to permit access by the inspector, extensive disassembly of the brake assembly, or both. Such steps may increase inspection times in associated costs. A pressure check device 300 may address some or all of these deficiencies.

Referring to FIG. 7, an example of a pressure check device 300 is shown that facilitates checking of the sealing of the caliper housing 70. The pressure check device 300 may include a fitting 302, a pressure sensor 304, and a communication device 306 and may be fluidly connected to a pressure adjustment device 308.

The fitting 302 may be fluidly connectable to the cavity 80. For instance, the fitting 302 may be received in the hole 84 in the caliper housing 70 when the pressure check device 300 is installed. The fitting 302 may be fluidly connectable to the pressure sensor 304 and the pressure adjustment device 308.

The pressure sensor 304 may be fluidly connectable to the cavity 80. The pressure sensor 304 may provide a signal, output, or response indicative of the fluid pressure or air pressure in the cavity 80. The pressure sensor 304 may be of any suitable type, such as an electronic pressure sensor or a non-electronic pressure sensor. The pressure sensor 304 may be of any suitable type and may be disposed in any suitable location, such as between the cavity 80 and the pressure adjustment device 308. As such, the pressure sensor 304 may be disposed outside the brake assembly 10 in one or more configurations.

The communication device 306 may provide information regarding the pressure inside the cavity 80. The communication device 306 may be of any suitable type. For instance, the communication device 306 may produce an audible output, visual output, tactile output, or combinations thereof. Some examples of communication device 306 may include a display, light, speaker, haptic device, or combinations thereof. In at least one configuration, the communication device 306 may be a gauge that may have a digital or analog display that shows the pressure detected or measured by the pressure sensor 304.

The pressure adjustment device 308 may provide negative pressure, positive pressure, or both. For instance, the pressure adjustment device 308 may provide negative pressure to extract fluid from the cavity 80 through a passage in the fitting 302. Conversely, the pressure adjustment device 308 may provide positive pressure to provide fluid to the cavity 80 through the passage in the fitting 302 to increase the fluid pressure inside the cavity 80. The fluid inside the cavity 80 may be a gas or gas mixture such as air; however, it is contemplated that another gas or gas mixture could be provided other than air like nitrogen gas, helium gas, an inert gas, or the like. The term "air pressure" may be used herein to generically reference air as the gas mixture or other gases or gas mixtures that may be provided to or exhausted from the cavity 80. In at least one configuration, the pressure adjustment device 308 may be a pump or be connected to a pump that may be manually powered or non-manually powered.

Figure 8:
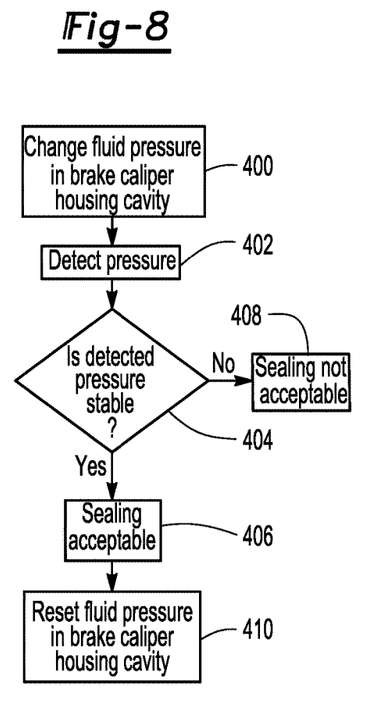
FIG. 8 is a flowchart of a method of checking sealing of the brake caliper housing.

Referring to FIG. 8, a flowchart of a method of checking sealing of a caliper housing 70 is shown. This method may be employed with a brake assembly having a caliper housing 70 as previously discussed. The method may be employed during initial assembly of the brake assembly 10 by the manufacturer or by a technician during maintenance or inspection of the brake assembly 10. In addition, the method may be employed when the brake assembly 10 is not operated to extend or retract the brake pad assemblies.

The method steps below are discussed in the context of the pressure check device 300 being fluidly connected to the cavity 80 of the caliper housing 70, such as via the hole 84. As such, installation of the pressure check device 300 is not included in the method steps.

At block 400, the fluid pressure in the cavity 80 may be changed. The fluid pressure may be changed with the pressure adjustment device 308. For instance, the pressure adjustment device 308 may be connected to the fitting 302. A valve may be opened and the pressure in the cavity 80 may be changed by either supplying air to the cavity 80 to increase the fluid pressure in the cavity 80 above the surrounding atmospheric pressure or by extracting air from the cavity 80 to decrease the fluid pressure in the cavity 80 below the surrounding atmospheric pressure. The change in pressure may be an amount that is outside the error range of the pressure sensor 304. As an example, the pressure may be increased or decreased by 10 psi (69 kPa) or more.

At block 402, the sealing condition or sealing of the cavity 80 and the guide pin openings 86 may be determined with the pressure check device 300. The sealing condition may be determined after the fluid pressure inside the cavity 80 has been changed. For example, the fluid pressure may be detected with the pressure sensor 304 and may be indicative of the pressure in the cavity 80 as well as in the internal passages 88 and the guide pin openings 86 that are fluidly connected to the cavity 80.

At block 404, the detected pressure may be evaluated to determine whether the detected pressure is stable. Stable pressure may be indicative of no leaks or a sufficiently sealed cavity 80. For instance, the detected pressure may be stable when the pressure detected by the pressure sensor 304 is within a predetermined range after a predetermined period of time. The predetermined range may be based on the design tolerances of the pressure sensor 304. As an example, the predetermined range may be ±1 psi (6.9 kPa) although larger or smaller ranges are contemplated if accommodated by the pressure sensor 304. The predetermined period of time may be based on development testing. As an example, the predetermined period of time may be greater than 5 seconds, such as between 5 seconds and 60 seconds, and predetermined periods of time greater than 60 seconds are also contemplated. If the detected pressure is stable, then the method may continue at block 406. If the detected pressure is not sufficiently stable, then the method may continue at block 408.

At block 406, the cavity 80 is considered to be adequately sealed or acceptably sealed since the detected pressure is sufficiently stable over or at the end of the predetermined period of time.

At block 408, the cavity 80 and one or more guide pin openings 86 that are fluidly connected to the cavity 80 are not considered to be adequately or acceptably sealed from the surrounding environment since the detected pressure is not sufficiently stable over or at the end of the predetermined period of time. The presence of one or more leaks may allow pressurized gas in the cavity 80 to escape the cavity 80 and/or a guide pin opening 86 if positive pressure has been provided or may allow air from the surrounding environment to enter the cavity 80 and/or a guide pin opening 86 if negative pressure has been applied. The brake assembly 10 may then undergo further inspection or evaluation to determine the source of any leaks and to repair the leak or leaks.

At block 410, the pressure in the cavity 80 may be reset to its previous state. For instance, if negative pressure was applied, then additional air may be provided to the cavity 80 to generally equalize the pressure in the cavity 80 with the surrounding atmospheric pressure. Similarly, if positive pressure was applied, then air may be exhausted from the cavity 80 to generally equalized the pressure in the cavity 80 with the surrounding atmospheric pressure. The pressure in the cavity 80 may be reset by providing or removing air via the pressure check device 300 or simply by removing the pressure check device and allowing air to pass through the hole 84 before closing or plugging the hole 84.

The present invention may allow a brake caliper housing to be provided with internal passages that allow sealing of a central cavity of a caliper housing as well as sealing of guide pin passages to be evaluated. As such, the integrity of seals associated with guide pin assemblies and components that enclose the central cavity may be simultaneously checked. Moreover, seal integrity may be checked with or without the wheels installed which may reduce inspection time. For example, seals associated with the guide pin assemblies are currently checked by removing a wheel and visually inspecting seals or boots associated with the guide pin assembly. Such a visual inspection takes more time since the wheel must be removed and is less reliable than a non-visual check in which sealing integrity is actively assessed by changing the pressure inside the caliper housing and determining whether a seal is actually functioning as intended.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of checking sealing of a brake caliper housing, the method comprising:
   providing a brake assembly that comprises a guide pin and the brake caliper housing, the brake caliper housing being slidable with respect the guide pin; and comprising a cavity, a guide pin opening that receives the guide pin, and an internal passage that extends from the cavity to the guide pin opening and fluidly connects the cavity to the guide pin opening;
   fluidly connecting a pressure check device to the cavity;
   changing a pressure of a fluid inside the cavity; and
   determining a sealing condition of the cavity and the guide pin opening with the pressure check device after changing the pressure.

2. The method of claim 1 wherein determining the sealing condition includes detecting the pressure inside the cavity after changing the pressure.

3. The method of claim 2 wherein the guide pin opening is sealed when the detected pressure inside the cavity remains stable for a predetermined period of time.

4. The method of claim 3 wherein changing the pressure includes increasing the pressure inside the cavity and the guide pin opening.

5. The method of claim 4 further comprising decreasing the pressure inside the cavity and the guide pin opening after determining whether the pressure inside the cavity remains stable.

6. The method of claim 3 wherein changing the pressure includes decreasing the pressure inside the cavity and the guide pin opening.

7. The method of claim 6 further comprising increasing the pressure inside the cavity and the guide pin opening after determining whether the pressure inside the cavity remains stable.

8. The method of claim 3 wherein the guide pin opening is not sealed when the detected pressure inside the cavity does not remain stable for the predetermined period of time.

9. The method of claim 1 wherein the brake caliper housing includes a second guide pin opening that receives a second guide pin and a second internal passage that extends from the cavity to the second guide pin opening and wherein determining the sealing condition includes detecting the pressure inside the cavity, the guide pin opening, and the second guide pin opening.

10. The method of claim 9 wherein the internal passage and the second internal passage are spaced apart from each other and the guide pin opening and the second guide pin opening are sealed when the detected pressure remains stable for a predetermined period of time.

11. The method of claim 1 wherein the brake caliper housing defines a through hole that extends from the cavity and the pressure check device is fluidly connected to the cavity via the through hole.

12. The method of claim 1 wherein the brake caliper housing further comprises:
a second guide pin opening that is spaced apart from the cavity and that receives a second guide pin that facilitates sliding movement of the brake caliper housing;
a second internal passage that extends from the cavity to the second guide pin opening and that fluidly connects the cavity to the second guide pin opening; and
a first lateral cavity side and a second lateral cavity side that are disposed at opposing lateral sides of the cavity, wherein the internal passage extends from the first lateral cavity side to the guide pin opening and the second internal passage extends from the second lateral cavity side to the second guide pin opening.

13. A brake caliper housing comprising:
a body that defines:
a cavity;
a first guide pin opening that is spaced apart from the cavity and that is adapted to receive a first guide pin that facilitates sliding movement of the brake caliper housing; and
a first internal passage that extends from the cavity to the first guide pin opening and fluidly connects the cavity to the first guide pin opening.

14. The brake caliper housing of claim 13 wherein the body defines:
a second guide pin opening that is spaced apart from the cavity and that is adapted to receive a second guide pin that facilitates sliding movement of the brake caliper housing; and
a second internal passage that extends from the cavity to the second guide pin opening and fluidly connects the cavity to the second guide pin opening.

15. The brake caliper housing of claim 14 wherein the body includes a first lateral cavity side and a second lateral cavity side that are disposed at opposing lateral sides of the cavity, wherein the first internal passage extends from the first lateral cavity side to the first guide pin opening and the second internal passage extends from the second lateral cavity side to the second guide pin opening.

16. The brake caliper housing of claim 15 wherein the first internal passage is disposed proximate a top end of the first lateral cavity side and is disposed above the first guide pin opening.

17. The brake caliper housing of claim 14 wherein the first internal passage is spaced apart from the second internal passage.

18. The brake caliper housing of claim 14 wherein the second internal passage becomes progressively narrower as the second internal passage extends from the cavity to the second guide pin opening.

19. The brake caliper housing of claim 13 wherein the body defines a through hole that extends through a back wall of the brake caliper housing to the cavity, the through hole extends along a through hole axis, and the first internal passage extends away from the through hole axis.

20. The brake caliper housing of claim 19 wherein the body has a front wall that is disposed opposite the back wall and that defines an aperture of the cavity, wherein the first internal passage is axially positioned between the front wall and the back wall.

21. The brake caliper housing of claim 13 wherein the first internal passage becomes progressively narrower as the first internal passage extends from the cavity to the first guide pin opening.

* * * * *